Figure 1:
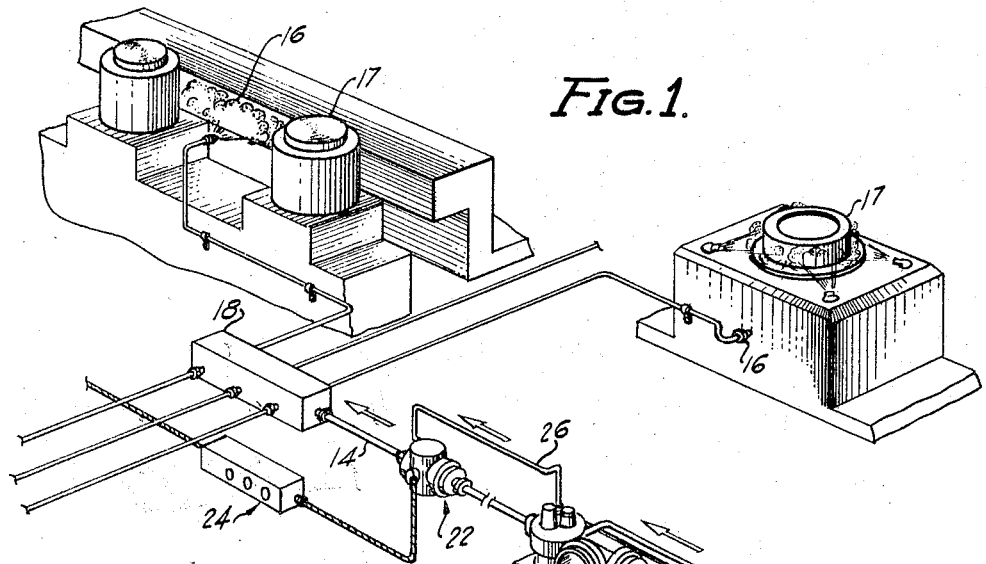

March 7, 1967

N. H. KADIVNIK 3,308,300

PHOTODETECTION FLUID MONITOR INCLUDING ALARM
CIRCUIT WITH FAIL-SAFE MEANS

Filed Sept. 30, 1963

2 Sheets-Sheet 1

INVENTOR
Norman H. Kadivnik

By Norton Lesser
Attorney

March 7, 1967 N. H. KADIVNIK 3,308,300
PHOTODETECTION FLUID MONITOR INCLUDING ALARM
CIRCUIT WITH FAIL-SAFE MEANS
Filed Sept. 30, 1963 2 Sheets-Sheet 2
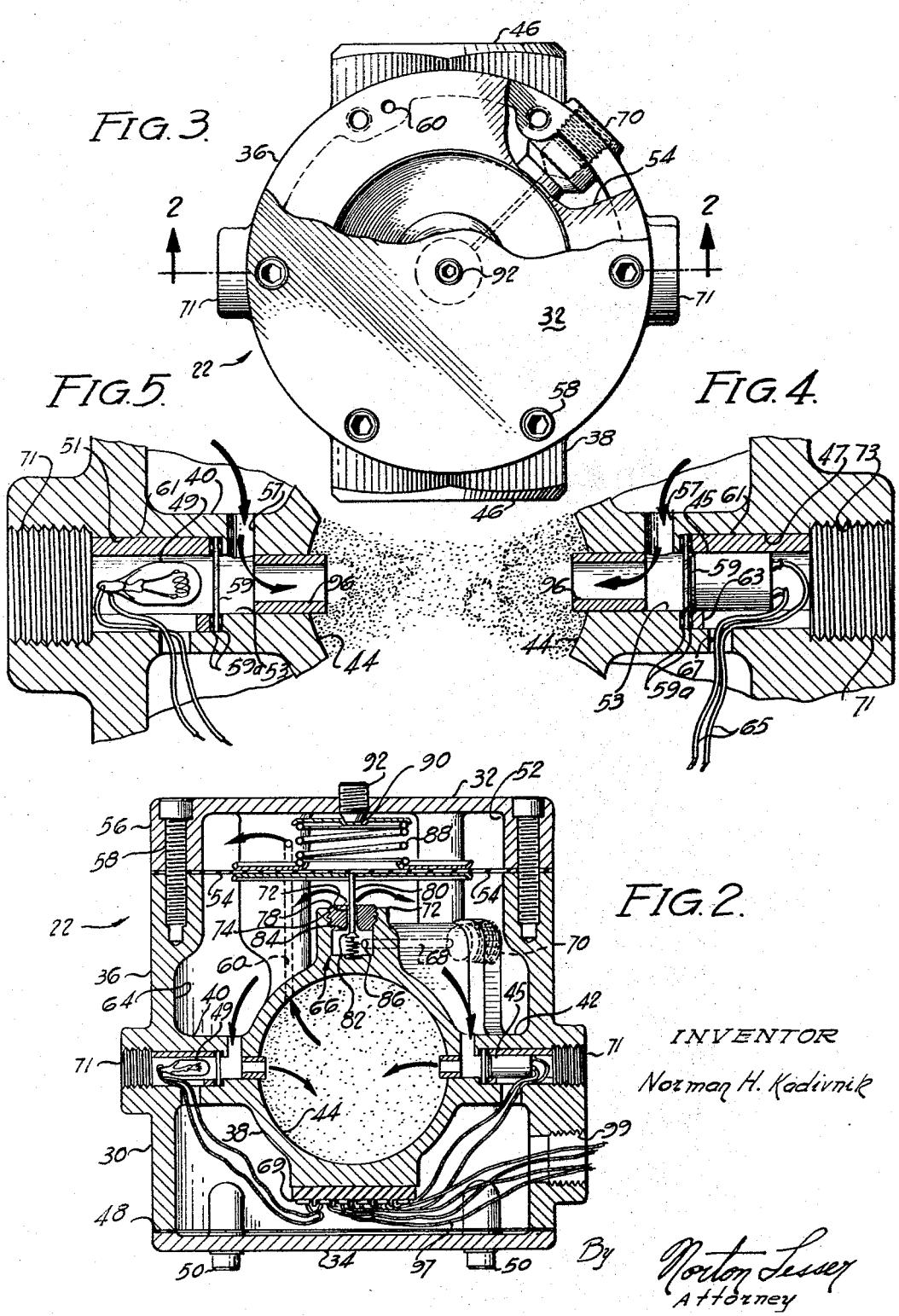
INVENTOR
Norman H. Kadivnik
By Norton Lesser
Attorney

United States Patent Office 3,308,300
Patented Mar. 7, 1967

3,308,300
PHOTODETECTION FLUID MONITOR INCLUDING ALARM CIRCUIT WITH FAIL-SAFE MEANS
Norman H. Kadivnik, Chicago, Ill., assignor to Stewart-Warner Corporation, Chicago, Ill., a corporation of Virginia
Filed Sept. 30, 1963, Ser. No. 312,767
5 Claims. (Cl. 250—218)

This invention relates to apparatus for monitoring fluids having substantial densities to the passage of light and more particularly to automatic means for giving indications of the operation of the properties leading to the contamination of monitoring apparatus.

For example, apparatus in monitoring the fluid the apparatus of this invention is particularly useful with an oil mist lubrication system to monitor the delivery of oil in aerosol form in lubricant distribution lines. It is to be understood that although the monitor is ideally suited for oil mist and is described in this application with reference to such a system that it may be applicable to other types of fluid handling systems in which the detection of optically dense and contaminating fluids is desired. However, because of the particular suitability the invention will be disclosed with reference to an oil mist lubrication system.

Briefly, oil mist systems operate to lubricate bearings and the like by admixing high velocity air and liquid oil to generate an aerosol of very fine oil particles. The heavier particles are caused to condense by appropriate baffle means and the resulting aerosol or oil mist is transported through conduits to the desired bearing locations. The mist may be transformed into a more usuable state by means of appropriate fittings adjacent the bearings. For example, the mist may be condensed into droplets or into a spray whichever may be appropriate for the particular bearing.

The oil mist type of lubrication provides an automatic lubricating means which can operate unattended and continuously for long periods of time. Since these systems may be used to lubricate expensive machinery and the like, it is most desirable that means be provided to monitor the proper operation of the system. The apparatus of the present invention accomplishes this purpose by monitoring the presence of mist flowing in the conduit lines from the output of the oil mist generator unit.

The invention herein claimed is described with reference to the fluid density monitor claimed in the copending application No. 312,579 of Thomas E. Bjorn entitled Fluid Monitor, filed on even date hereof, now Patent No. 3,268,734 issued on August 23, 1966, and both owned by the Stewart-Warner Corporation, 1826 Diversey Pkwy., Chicago 14, Illinois. This invention is directed primarily to the alarm circuitry for use therewith to provide indications of the fluid density monitoring function.

The alarm circuitry of this invention provides an ideal combination of fail safe operation, versatility in monitoring fluids of different optical densities, and economical use of electrical components.

It is highly desirable that an automatic monitoring system give reliable indications not only of the presence of the monitored material, but also of any failures in the monitoring system itself. This is of especial importance when used with oil mist lubrication systems which are called upon to service large complex and expensive industrial machinery.

The monitoring system should also be capable of monitoring fluids of different optical densities. There are many instances when the amount or type of lubricant in an oil mist system must be changed to accommodate changes in conditions. The monitoring system should have adequate and easily operable calibration means to compensate for such changes.

It is, therefore, an object of this invention to provide a fluid monitoring system having reliable indicating and alarm circuitry.

It is another object of this invention to provide a fluid monitoring system which is easily calibrated to monitor fluids of different optical densities.

In addition it is an object of this invention to provide indicating and alarm circuitry for use in a fluid monitoring system of the type herein disclosed.

Figure 6:
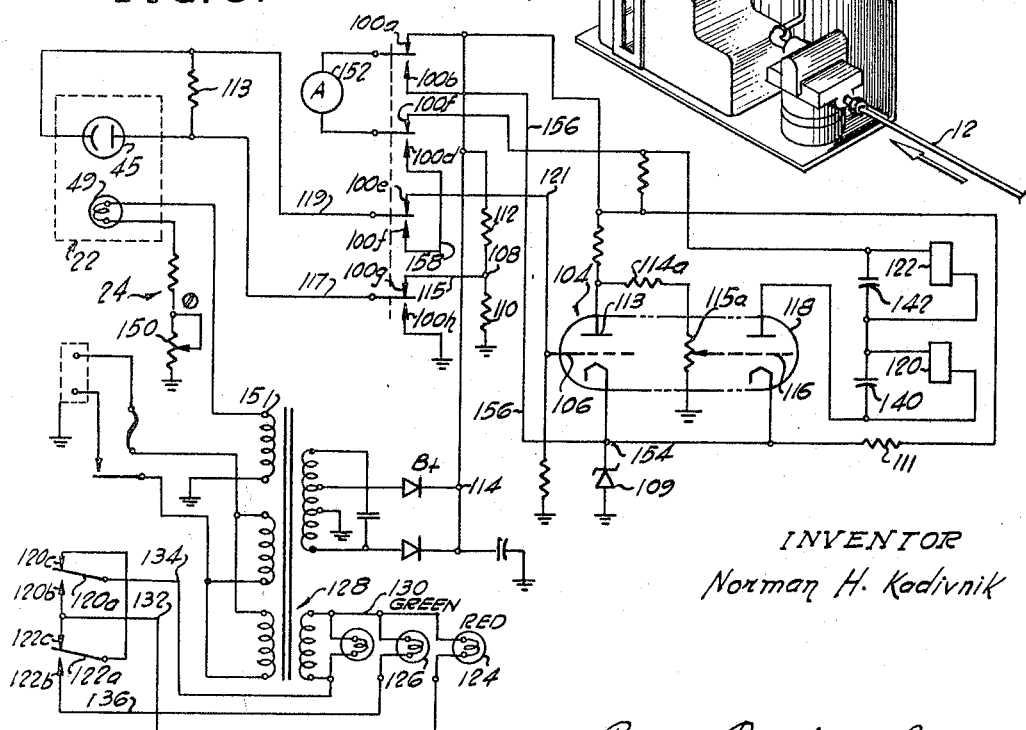

Other objects and advantages of the present invention will be readily recognized upon a further reading of the specification especially when taken in view of the accompanying drawings, in which:

FIG. 1 is an isometric view of an oil mist system including monitoring apparatus as taught by this invention;
FIG. 2 is an elevation view, in section, of an oil mist monitoring unit;
FIG. 3 is a plan view partially broken away of the oil mist monitoring unit;
FIG. 4 is an enlarged partial view, in section, of the monitor unit showing the photocell mounting means;
FIG. 5 is an enlarged partial view of the oil mist meter unit showing the mounting means for the lamp; and
FIG. 6 is a schematic diagram of the alarm circuit.

Referring now to FIG. 1 an oil mist system comprises a mist generator and reservoir unit 10 of any well known type in which air from source 12 is admixed with liquid oil from the mist generator and reservoir unit 10 so as to produce an aerosol of minute oil particles suspended in air. The aerosol is carried at low velocity under slightly superatmospheric pressure through conduit means 14 to the desired location. There may be several fittings 16 at the desired location to lubricate one or more bearings 17 on one or more pieces of machinery. If such is the case the conduit means 14 may terminate in a manifold 18 with feeder lines 20 branching out to the individual fitting 16. The fittings 16 may cause the application of oil mist, oil spray or condensed droplets to the bearings in a manner described in U.S. Patent No. 2,959,249, issued November 8, 1960, to K.E.A. Gothberg et al.

The monitor system includes a monitor unit 22 which may be located adjacent the inlet to the manifold 18. Of course more than one unit may be used if it is desired to monitor the mist going through any individual bearings 16. For best operation, of course, the monitor unit 22 should be located close to the lubricant fittings 16 rather than near the output of the mist generator and reservoir unit. In this manner, the supply of oil mist to the fittings is properly monitored rather than its output of the generator. Thus any blocks in the conduits are also indicated by the device.

Coupled with the monitor unit is an alarm circuit unit 24 to provide audible and/or visible indications of the presence or absence of oil mist in the monitor unit. Clean air from source 12 also is delivered to the monitor unit 22 by conduit 26 for reasons which will be more readily understood with reference to the detailed description of the monitor unit.

The monitor unit 22, as shown in FIGS. 2 through 5, comprises a housing 28 formed of a cast body member 30 and a pair of cap members 32 and 34, respectively. The body 30 has a substantially circular outer wall 36 and a tubular portion 38 extending therethrough formed integral therewith by virtue of the webbing portions 40 and 42 extending between the wall 36 and the tubular portion 38. The interior 44 of tubular portion 38 forms a passage for the oil mist and is threaded at 46 at either end for junction with the oil mist system conduits 14. The cap member 34 enclosing the bottom end of the body 36 is sealingly attached thereto by gasket 48 and bolts 50.

A photoelectric means 45, such as a photoresistive-type photocell is positioned in a recess 47 within web 42 so as to optically view the passage 44 as may best be seen in the enlarged segment of FIG. 4. A lamp 49 (FIG. 5) resides in a recess 51 within the other webbing 40 positioned diametrically opposite and in alignment with the photocell 45 to be optically coupled thereto. Since oil mist carried by the air through passage 44 has an optical density substantially greater than air, its presence in the air stream will cause variations in the amount of light received by the photocell 45 from the lamp 49.

The oil mist is a contaminating type of fluid having a tacky nature which would cause it to deposit on the surfaces of the photocell and lamp 49 to cause inaccurate indications of the amount of mist flowing through passage 44. Therefore, precautions have been made to prevent the deposit of oil on the surfaces of the photoelectric and illuminating elements 45 and 49 respectively by the following construction.

The recess 47 is formed by a bore 53 and counterbore extending from outside the housing 30 through web 42 to passage 44. A shoulder 57 is formed therein against which a lens 59 and gaskets 59a are held by a sleeve 61 surrounding the photocell 45. The sleeve 61 is slotted at 63 to provide access for the photocell electric leads 65 through aperture 67 to a terminal board 69 (FIG. 2). A sealing plug 71 in a threaded counterbore 73 holds the photocell 45, sleeve 61, gaskets and lens 59 in tight assembly against the shoulder 57. The lamp 49 is supported is assembly with its own lens 59, gaskets 59a and sleeve 61 in identically the same manner as the photocell 45 by a sealing plug 71. Hence the detailed description of the assembly will not be included.

The photocell and lamp are both recessed from the oil mist carrying passage 44 in order that they may be protected from contamination from oil. Duct means 57 extend between the fresh air chamber 64 and the recesses 53 between the lenses 59 and the passage 44 for flowing air from the air chamber 64 past the lens into the passage 44. Sleeves 96 are positioned at the open terminal ends of the recesses 53 to provide pressure drops for air flowing from the chamber 64.

Referring again to the housing the top cap member 32 is cup-shaped to define a chamber 52 with a diaphragm 54 captured between the flange 56 of cap 32 and the circular top of body 36. The diaphragm 54 also provides a seal for the cap 32 and the cap is fastened to the outer wall 36 by bolts 58. The chamber 52 defined by the diaphragm 54 and the upper cover 32 is in communication with the passage 44 by means of a duct 60 formed by aligned bores in the wall 36 and the flange 56 of the cap 32. Thus, the chamber 52 is subjected to the oil mist pressure of the passage 44.

A second chamber 64 is formed by the diaphragm 54 interior of circular walls 36, lower cover 34 and the exterior surface of tubular portion 38. This chamber 64 is connectable to a fresh air supply by means of a valve assembly 66 and a duct 68 bored through cast structure 70 provided particularly for that function. The valve assembly 66 comprises a plug 72 threaded into a recesss 74 formed within a protruding structure 76 on the tubular portion 38. Plug 72 has a passage 78 to which valve stem 80 extends to abut the diaphragm 54 at its one end. The other end of the stem 80 carries the valve member 82 which cooperates with the valve seat 84 to control the passage of clean air from duct 68 through passage 78 to chamber 64. A spring 86 maintains the valve 82 in engagement with the valve seat 84 and/or the upper end of the stem 80 in contact with the diaphragm 54.

A spring 88 extending between the top of diaphragm 54 and an adjusting mechanism 90 including screw 92 extending through cover 32 permits regulation of the pressure differential between chambers 52 and 64 so that proper scrubbing takes place as hereinbefore described.

As hereinbefore discussed provisions are made for flowing clean air from the chamber 64 through ducts 57 past the lenses 59 protecting the photocell 45 and lamp 49, through the sleeves 96 to the oil mist carrying passage 44. This flow of air provides a scrubbing action for maintaining the lens 59 clean and free from contaminating oil. The purpose of the diaphragm 54 and the valve arrangement 66 is to maintain the proper pressure differential between the passage 44 and the chamber 64 to maintain the correct direction of air flow. That is, clean air must flow from the clean air chamber 64 past the lenses 59 to the oil mist passage 44. A pressure differential in the opposite direction would cause flow of mist laden air from the passage 44 past the lenses to chamber 64 which would cause severe contamination of the lens.

It has been found that the device operates properly when the pressure differential between the chamber 64 is maintained at about 2 inches of water. It is, of course, important that the pressure differential not be too great, for the clean air entering the passage 44 through the recesses 53 will tend to dilute the oil mist and disturb the lubricating function.

The proper pressure differential is maintained by the diaphragm 52 and valve assembly 66. One side of the diaphragm is subjected directly to the clean air pressure of chamber 64 and the other side is subjected to the pressure of the mist laden air in passage 44 by means of passage 60 interconnecting passage 44 and chamber 52. The spring with the diaphragm arrangement will operate to regulate the pressure of the air in chamber 64 with respect to the pressure of the oil mist laden air in the passage 44 regardless of the absolute pressures in the system. This, of course, is extremely important to prevent the backward flow of oil mist laden air through the recesses so as to contaminate the lenses 59 and impair the optical path between the lamp 49 and the photocell 45.

The photocell and lamp are electrically connected to the alarm circuits 24 by cable means 97 extending from the terminal board 69 through a sealing plug 99 provided in the wall 36 of the body portion.

Reference is now made to the schematic diagram of FIG. 6 showing one type of alarm circuit which may be used with the monitor hereinbefore described.

The photoresistive type photocell 45 in the monitor unit 22 is connected through contact 100e of a ganged selector switch 100 to the input of a triode amplifier 104 in the alarm circuits unit 24. When the selector switch 100 is in the operate position, as shown in FIG. 6 the photocell is series connected between the grid 106 and junction 108 in the voltage divider comprising resistors 110 and 112 between ground and the power supply B+ terminal 114. This circuit may be traced from ground, resistor 110, junction 108, conductor 115, contacts 100g of selector switch 100, conductor 117, photocell 45, conductor 119, contacts 100e and conductor 121 to grid 106. Resistor 113 across the photocell 45 serves to decrease its sensitivity somewhat to prevent spurious operation by minute changes of light. The resistors 110 and 112 are selected so that the operating point of amplifier 104 is on the linear part of its operating characteristic. The input bias of the amplifier 104 is stabilized by the voltage across zener diode 109 in the cathode circuit of the amplifier also connected through resistor 111 to the B+ voltage at terminal 114.

The output from plate 113 of amplifier 104 is fed through resistor 114a and potentiometer 115a to the grid 116 of the second triode amplifier 118. A pair of relays 120 and 122 are series connected in the plate circuit of amplifier 118 and are set to operate at different levels of plate current through the amplifier 118. That is, one of the relays, 122 for example, is set to operate and pull in armature 122a at a current level which represents a normal operating condition, whereas the other relay, 120, is set to pull in its armature 120a at a current level signifying a malfunction in the system.

Each of the relays 120 and 122 have a set of make contacts 120b, 122b and a set of break contacts 120c, 122c, respectively. These contacts are connected through appropriate circuitry to energize the red and green warning lights 124 and 126 in the following manner. When there is insufficient current passing through the plate circuit of amplifier 118 to energize either of the relays 120 or 122 the contacts assume the position as shown in FIGURE 6 to connect the red light 124 to electric power through the circuit including conductor 130, red light 124, conductor 132, break contacts 122c, armature 122a, break contact 120c, armature 120a and conductor 134 to the secondary of a power transformer 128. The normal operating condition is signified by the passage of sufficient plate current through amplifier 118 so that relay 122 is pulled in and relay 120 is not pulled in. In this condition the red light 124 is disconnected and green light 126 is connected across the transformer 128 through the circuit comprising conductor 130, green light 126, conductor 136, make contact 122b, armature 122a, break contact 120c, armature 120a and conductor 134.

If the plate current through amplifier 118 is sufficiently high to pull in both relays 120 and 122, the green light 126 is disconnected and the red light 124 is connected across the power transformer 128 through the circuit including conductor 130, red light 124, conductor 132, make contacts 120b, armature 120a and conductor 134.

The circuitry as hereinbefore described operates in conjunction with the oil mist monitor unit to monitor the flow of oil mist to the supply conduits in the following manner. When the oil mist is at the desired flow rate, the light received at the photo cell is such to cause the amplifiers to maintain only relay 120 pulled in. The plate current from amplifier 118 is insufficient to pull in relay 122 so that the red warning light is deenergized and the green light 126 is energized through the circuit hereinbefore disclosed.

When no mist is flowing through the passage 44 in the monitor unit 22 between the lamp 49 and the photocell 45 the light quantity received is maximum causing the photocell resistance to be minimum. Thus the grid 106 of amplifier 104 is more positive and the grid of amplifier 118 is more negative. The plate current of amplifier 118 is reduced so that neither relay 120 or 122 is operated and the red lamp 124 is energized by the circuit hereinbefore described.

When an overabundance of oil mist is present in the passage 44 of the monitor unit 22 the photocell 45 receives a minimum quantity of light and hence its resistance is maximum. This increases the bias to the amplifier 104 reducing its plate current and hence causes the grid 116 of amplifier 118 to be substantially more positive. Both relays 120 and 122 are pulled in by the higher plate current so that the red warning light 124 is again energized through the circuit hereinbefore described.

Oil mist systems often operate to cause an insteady flow of oil mist through its supply conduits. Puffs of dense mist as well as intermittent periods of less dense flow are often experienced in these systems. Therefore capacitors 140 and 142 are provided in parallel with each respective relay 120 and 122 to increase the operating time constants.

It is desirable that the monitor apparatus be applicable to monitor the flow of oil mist regardless of the type of lubricant used. It should be operable with oils having different colors or different densities or simple means should be provided for adjusting it to operate properly. A calibration means is required and this is provided by the potentiometer 150 in the obvious circuit between ground and power supply terminal 151 for energizing lamp 49 in the monitor unit 22. In addition the multibank switch 100 has a calibrate position to connect the photocell 45 in a calibrating circuit so that the lamp intensity may be adjusted in accordance with the particular lubricant being used. When the switch 100 is in the calibrate position the photocell is in series connection with an ammeter 152 across the regulated voltage source provided at the zener diode 109. The circuit extends from the zener diode 109 through junction 154, conductor 156, contact 100b of switch 100, meter 152, contact 100d, conductor 158, contact 100f, photocell 45 and contact 100h to ground.

To calibrate the system for operation with a particular lubricant the switch 100 is turned to the calibrate position and the oil mist system is operated for a sufficient length of time to stabilize itself. When the flow rate of the oil mist through the supply conduits is at a desired level, the potentiometer 150 in the lamp energizing circuit is manipulated until the light level is such to cause the meter 152 to read a certain current value. The circuit parameters in the amplifiers are chosen so that light level will cause a plate current through amplifier 118 midway between the pull-in values of relays 120 and 122, respectively. Thus deviations of the light received by the photocell due to an excess or absence of oil mist in the air will cause the relays 120 and 122 to operate to signify such condition. Switch 100 is then moved to its operate position and the apparatus is set to perform its monitoring function.

The fail safe nature of the monitoring circuits can be readily seen. Any malfunction which causes an abnormally large or small plate current through amplifier 118 will cause the red warning light 124 to be energized. In addition, any circuit discontinuity or malfunction of the lamp in the monitor unit 22 will cause a red indication in the amplifier circuitry. It is to be noted that the circuit may be made completely fail safe by causing the insertion of a separate power supply, perhaps a battery across the secondary 128 by normally open relay contacts (not shown) whenever there is a commercial line failure to the power supply.

While there has been described one embodiment of the metering apparatus embodying the teachings of this invention, it is recognized that many modifications may be made thereto without departing from the spirit of the invention. Therefore, it is intended that the invention be limited only by the scope of the appending claims.

What is claimed is:

1. Apparatus for monitoring the presence of oil mist particles carried by a sample of air comprising, a light source and photocell optically arranged for producing an electric signal responsive to the optical density of the oil mist in the sample of air, a first amplifier, means including a voltage divider and a zener diode for biasing said first amplifier for stable linear operation, means including a selector switch for connecting said photocell to the input of said amplifier, a second amplifier having its input connected to the output of said first amplifier, first and second relays having their respective coils series connected to the output of said second amplifier and each having a set of make contacts and break contacts, said first relay adapted to operate its contacts at a current level therethrough below a predetermined level, said second relay adapted to operate its contacts at a current level therethrough above said predetermined level, a normal indication device, an abnormal indication device, a circuit extending through the contacts of both said relays to operate said normal indication device when only said first relay is operated, another circuit extending through contacts of both said relays for operating said abnormal indicating device only in response to both of said relays being restored, a third circuit extending only through the contacts of said second relay in response to said second relay being operated for operating said abnormal indicating device, an ammeter connected in series with said relays in response to said selector switch being operated to connect said photocell to the input of said first amplifier, means including said selector switch for selectively disconnecting said photocell from the input of said first amplifier and said ammeter from said relays and connecting said photocell in series with said ammeter and said zener diode, means for varying the intensity of said light source to control the resistance of said cell in accordance with the setting of said ammeter connected in series with said cell, and means for adjusting the signal level applied from said first amplifier to said second amplifier to select a current level through said relays intermediate the levels at which both said relays are operated in accordance with the setting of said ammeter connected in series with said relays.

2. Apparatus for use with an oil mist system of the type wherein an air stream carries oil mist having an opacity dependent both on the quantity and the quality of said oil the improvement comprising, a light source operated for transmitting light through said air stream, a light sensitive cell receiving said light for generating a signal corresponding to the opacity of the oil within said stream, an amplifier controlled by said signal for generating an output voltage proportional to the signal generated by said cell, a signalling arrangement, a pair of devices for controlling said signalling arrangement in accordance with either the restored or operated condition of each device, means for operating one of said devices in response to one output voltage generated by said amplifier, means for operating both of said devices in response to a different output voltage generated by said amplifier whereby (1) a light intensity greater than a predetermined value is signalled by said signalling arrangement in the event both said devices are restored, (2) a light intensity between said predetermined value and another predetermined value is signalled by said signalling arrangement in the event only said one device is operated, and (3) a light intensity less than said other predetermined value is signalled by said signalling arrangement in the event the other device is operated, an ammeter, means for optionally connecting said ammeter either in series with said devices or in series with said cell, means for adjusting the light transmitted to said cell in accordance with the reading of said ammeter in series with said cell for selecting a desired resistance value for said cell, and means for adjusting the signal applied from said cell to said amplifier in accordance with the reading of said ammeter in series with said devices for selecting an output voltage from said amplifier corresponding both with the quantity and the quality of said oil.

3. Apparatus for use with an oil mist system of the type wherein an air stream carrying an oil mist has an opacity dependent both on the quantity and the quality of said oil the improvement comprising, a light source operated for transmitting light through said air stream, a light sensitive cell receiving said light for generating a signal corresponding to the opacity of the oil within said stream, an amplifier having an operating voltage applied thereto and controlled by said signal for generating an output voltage directly proportional to the signal generated by said cell, a zener diode connected in series with said first amplifier for stabilizing the operating voltage applied to said amplifier, a signalling arrangement, a pair of serially connected devices for controlling said signaling arrangement in accordance with either the restored or operated condition of each device, means for operating one of said devices in response to one output voltage generated by said amplifier, means for operating both of said devices in response to a different output voltage generated by said amplifier whereby (1) a light intensity greater than a predetermined value is signalled by said signalling arrangement in the event both said devices are restored, (2) a light intensity between said predetermined value and another predetermined value is signalled by said signalling arrangement in the event only said one device is operated, and (3) a light intensity less than said other predetermined value is signalled by said signalling arrangement in the event the other device is operated, an ammeter, means for optionally connecting said ammeter either in series with said devices or in series with said cell and zener diode, means for adjusting the light transmitted by said source in accordance with the reading of said ammeter in series with said cell for selecting a desired resistance value for said cell, and means for adjusting the signal applied from said cell to said amplifier in accordance with the reading of said ammeter in series with said devices for selecting an output voltage of said amplifier to correspond both with the quantity and the quality of said oil.

4. Apparatus for use with an oil mist system of the type wherein an oil mist is carried by an air stream and wherein variations in the density of said mist depend both on the quantity and the quality of said oil the improvement comprising, a light source operated for transmitting light through said air stream and mist, a light sensitive cell for generating a signal corresponding to the intensity of the light transmitted through said stream and mist with said intensity varying with the quantity and quality of the oil and the condition of said source, a first amplifier having an operating voltage applied thereto and proportional to the signal generated by said cell, a zener diode connected in series with said first amplifier for stabilizing the operating voltage applied to said first amplifier, a second amplifier controlled by said first output voltage to provide a second output voltage inversely proportional to said light intensity whereby said second output voltage rises in response to a diminishing light intensity transmitted through said stream and mist, a pair of serially connected relays each operated in response to an individually corresponding minimum second output voltage provided by said second amplifier, a pair of signal lamps controlled by said relays with one of said lamps lighted only in response to said one relay being solely operated and the other signal lamp being lighted only in response to either said one relay being restored or the other relay being operated, an ammeter, means for optionally connecting said ammeter either in series with said relays or in series with said cell and zener diode, means for adjusting the light transmitted by said source to control the resistance of said cell and compensate for the condition of said source in accordance with the reading of said ammeter in series with said cell, and means for adjusting the signal applied from said first amplifier to said second amplifier in accordance with the reading of said ammeter in series with said devices for selecting an output voltage of said second amplifier in accordance with both the quantity and the quality of said oil.

5. Apparatus for use with an oil mist system of the type wherein oils of any one of a plurality of different densities are carried by an air stream and wherein variations in said densities depend both on the quantity and quality of said oil the improvement comprising, a light source operated for transmitting light through said air stream, a light sensitive cell for generating a signal corresponding to the intensity of the light transmitted through said stream, a first amplifier having an operating voltage applied thereto and controlled by said signal for providing a first output voltage directly proportional to the signal generated by said cell, a zener diode connected in series with said first amplifier for stabilizing the operating voltage applied to said first amplifier, a second amplifier controlled by said first output voltage to provide a second output voltage inversely proportional to said light intensity whereby said second output voltage rises in response to a diminishing light intensity transmitted through said stream, a pair of serially connected relays each adapted to operate in response to an individually corresponding second output voltage generated by said second amplifier, and a pair of signal lamps controlled by said relays with one of said lamps lighted only in response to one of said relays being operated and the other relay being restored to signal a normal condition of said air stream, and the other signal lamp being lighted only in response to either said one relay being restored or said other relay being operated to signal an abnormal condition of said air stream.

References Cited by the Examiner
UNITED STATES PATENTS

| | | | |
|---|---|---|---|
| 1,828,894 | 10/1931 | Freygang | 250—218 |
| 2,667,102 | 1/1954 | MacDougall. | |
| 2,691,737 | 10/1954 | Holby | 88—145 |
| 2,907,993 | 10/1959 | Mathisen | 340—237 |
| 3,059,107 | 10/1962 | McCool | 317—149 |

RALPH G. NILSON, *Primary Examiner.*

M. ABRAMSON, *Assistant Examiner.*